United States Patent
Thomsen

(10) Patent No.: US 9,041,343 B2
(45) Date of Patent: May 26, 2015

(54) SYSTEM AND METHOD FOR PROTECTING A POWER CONSUMING CIRCUIT

(75) Inventor: Rune Thomsen, Loegumkloster (DK)

(73) Assignee: Secop GmbH, Flensburg (DE)

( * ) Notice: Subject to any disclaimer, the term of this patent is extended or adjusted under 35 U.S.C. 154(b) by 680 days.

(21) Appl. No.: 13/337,436

(22) Filed: Dec. 27, 2011

(65) Prior Publication Data

US 2012/0169274 A1 Jul. 5, 2012

(30) Foreign Application Priority Data

Dec. 30, 2010 (DK) ................................. 2010 70591

(51) Int. Cl.
*H02J 7/00* (2006.01)
*H02H 3/20* (2006.01)

(52) U.S. Cl.
CPC ........................................ *H02H 3/20* (2013.01)

(58) Field of Classification Search
CPC ........................................................ H02H 3/20
USPC ............................ 320/107, 162–165; 361/91.6
See application file for complete search history.

(56) References Cited

U.S. PATENT DOCUMENTS

| 7,274,543 | B2 * | 9/2007 | Nishikawa et al. | 361/56 |
| 7,791,399 | B2 * | 9/2010 | Zhou et al. | 327/340 |
| 8,345,398 | B2 * | 1/2013 | Mazzarisi et al. | 361/93.9 |
| 8,704,578 | B2 * | 4/2014 | Kurokawa | 327/318 |
| 2002/0024784 | A1 * | 2/2002 | Pinto de Oliveira | 361/91.6 |
| 2002/0071231 | A1 * | 6/2002 | Chloupek et al. | 361/91.6 |
| 2008/0007883 | A1 * | 1/2008 | Arndt et al. | 361/56 |
| 2008/0186644 | A1 * | 8/2008 | Migliavacca | 361/86 |
| 2008/0198522 | A1 * | 8/2008 | Thomsen | 361/77 |
| 2010/0110595 | A1 * | 5/2010 | Yang et al. | 361/56 |
| 2012/0188675 | A1 * | 7/2012 | Oppermann et al. | 361/91.6 |

* cited by examiner

*Primary Examiner* — Richard Isla Rodas
*Assistant Examiner* — Nathaniel Pelton
(74) *Attorney, Agent, or Firm* — McCormick, Paulding & Huber LLP

(57) ABSTRACT

A system for protecting a power consuming circuit, the system comprising two terminals for receiving power and two terminals for providing received power. Between one of the receiving terminals and a providing terminal, a transistor is provided which is controlled by a Zener diode and to break the connection between one of the receiving terminals and a providing terminal, if a voltage over the providing terminals or the receiving terminals exceeds the breakdown voltage of the Zener diode.

14 Claims, 2 Drawing Sheets

SYSTEM AND METHOD FOR PROTECTING A POWER CONSUMING CIRCUIT

CROSS REFERENCE TO RELATED APPLICATION

Applicant hereby claims foreign priority benefits under U.S.C. §119 from Danish Patent Application No. PA 2010 70591 filed on Dec. 30, 2010, the contents of which are incorporated by reference herein.

TECHNICAL FIELD

The present invention relates to a system and a method of protecting a power consuming circuit from excessive voltages and in particular to a system and method for protecting a circuit from Load Dump situations, surge pulses or voltage transients.

BACKGROUND OF THE INVENTION

The protection of Load Dump/surge pulse/voltage transient situations usually is performed by shorting the terminals, such as through a bidirectional Zener diode, to the circuit, but the high voltages caused may destroy these shorting means and thus the protection circuit. Also other technologies are used.

SUMMARY OF THE INVENTION

It is an object of embodiments of the invention to provide a circuit which can protect a power consuming circuit from a Load Dump/surge pulse/voltage transient situation where e.g. a battery feeding the power consuming circuit is disconnected from a charging unit, whereby the charging unit will provide a power surge which could otherwise destroy the power consuming circuit.

It is another object of the invention to provide a Load Dump protection circuit which may be controlled also by other situations so as to be used for multiple purposes.

So, in a first aspect the present invention relates to a system for protecting a power consuming circuit, the system comprising:
a first and a second terminal adapted to receive power,
a third and a fourth terminal being adapted to supply received power to the power consuming circuit, the first terminal being connected to the third terminal and the second terminal being connected to the fourth terminal,
a first transistor having at least a first, a second and a third leg, the first leg being connected to one of the first and second terminals and the second leg being connected to that of the third and fourth terminals connected to the one terminal, the transistor being adapted to provide or break a conductive connection between its first and second legs based on a signal on the third leg, the other of the first and second terminals and of the third and fourth terminals being electrically interconnected,
a protective element connected between one of the group consisting of the first and third terminals and one of the group consisting of the second and fourth terminals, the protective element being adapted to output a signal, if the voltage thereover exceeds a predetermined voltage; and
means for transmitting a signal from the protective element to the third leg.

In the present context, the protection is primarily a protection against high voltage surges which may be caused by a power/voltage provider for a number or reasons. The present system is meant to prevent such high voltages from reaching the consumer.

Usually, a terminal is a conductor or a part thereof which may be used for engaging or contacting other electrical circuits, such as a battery or a power source. Normally, a terminal is useful for providing an electrical connection which may be broken or detached, such as battery terminals in a flashlight or solder pads on a PCB.

The present system is provided between the terminals for receiving power and those for delivering it to the consumer. In this respect, the power may be supplied in any manner, such as from a battery, a power generator, a power station, mains power, a wind turbine, solar cells or the like.

Also, the consumer may be any type of consumer, such as a group of power consuming apparatus. Power consuming apparatus may be TVs, computers, refrigerators, freezers, lamps, monitors, other automotive equipment, or the like. The consumer may be more or less all power consumers of a house, apartment, office, vessel and/or vehicle, for example.

In the present context, the first transistor may be any type of transistor, such as a bipolar or a field-effect transistor. A number of different denotations and basic technologies are used, such as JFET, MOSFET, BJT, IGFET, IGBT, and any polarity may be used, such as NPN, PNP, N-channel or P-channel. As mentioned further below, the transistor may have therein a protective diode, which is desired for at least power dissipation purposes.

Different types of transistors may have different numbers of legs. However, at least three legs are provided of which a signal on one leg, typically called the Base or Gate, will control the conducting properties between the two other legs, the so-called Collector or Source and the so-called Emitter or Drain.

Naturally, other electrical elements, such as diodes, resistors, capacitors, coils or the like may also be connected to one of the terminals and optionally between the terminals, such as in series with the transistor. However, in order to not waste power, the only component preferably present between each pair of one of the first or second terminals and that of the third and fourth terminals connected thereto is the first transistor and optionally the below second transistor if desired.

The breaking and providing of electrical connection between the legs of the transistor is the usual operation of a transistor. Usually, the signal merely is a voltage which then will control a current flowing between the first and second legs. Naturally, this voltage will depend on the circumstances, the transistor etc. This is well known to the skilled person.

In this connection, the protective element is an element monitoring the voltage over one of the group consisting of the one of the first and third terminals and one of the group consisting of the second and fourth terminals. Typically, the protective element monitors the voltage over the first and second terminals or the third and fourth terminals. If additional electric elements are present, such as coupled in series, between these terminals, the voltage between or over such elements may also be used.

The protective element is adapted to output a signal, if the voltage thereover exceeds a predetermined voltage. This predetermined voltage usually is selected to exceed the usual voltage provided at the first and second terminals but sufficiently low to not harm or destroy the consumer. On the other hand, the transistor preferably is dimensioned and selected to withstand a higher voltage, such as a highest conceivable voltage.

The signal preferably is adapted to the transistor in order for the signal to operate the transistor to not conduct between the first and second legs. In this connection, the signal output of the protective element may be subsequently adapted to the transistor. The transmitting means may then comprise means for performing this adaptation. Alternatively, the protective element may comprise means for electrically adapting a signal to provide the signal to be output to the third leg. Then, the transmitting means may simply be a conductor. The adaptation may e.g. be a reduction or increase in voltage and/or current.

The protecting element, naturally, may be any type of circuit adapted to output a signal when the threshold voltage is reached.

In one embodiment, the protective element comprises a Zener diode connected in series with one or more first electrical components, the Zener diode having a breakdown voltage corresponding to the predetermined voltage, the signal corresponding to a voltage over one or more of the Zener diode and the one or more first electrical components. Other types of protective elements may be amplifiers, comparators, voltage dividers or the like. It is noted that the signal output may be a voltage or current exceeding (or falling below) a predetermined value or limit over (under) which the transistor will act.

In this connection, it may be advantageous to provide a Schmitt trigger or circuitry with similar function, so that the transistor will not open immediately when the voltage has fallen below the threshold limit but rather will wait, until the voltage has fallen a predetermined voltage below the threshold limit.

One embodiment further comprises a first diode being positioned so as to conduct from the first leg and to the second leg. This diode may be a protection diode of the transistor and which may be used for power dissipation reasons in order to prevent the other parts of the transistor from having to dissipate the heat generated by the current transmitted there through.

In one embodiment, the system further comprises:
  means for preventing power from flowing from the first and second terminals to the third and fourth terminals, if a power source is positioned erroneously, the preventing means comprising a second transistor having at least a fourth, a fifth and a sixth leg, the fourth leg being connected to a predetermined one of the first and second terminals and the fifth leg being connected to that of the third and fourth terminals connected to the predetermined one terminal, the transistor being adapted to provide or break a conductive connection between its fourth and fifth legs based on a signal on the sixth leg,
  a second diode connected in series with one or more second electrical components and between one of the group consisting of the first and third terminals and one of the group consisting of the second and fourth terminals,
  means for transmitting a signal to the sixth leg, the signal corresponding to a voltage over one or more of the diode and the one or more second electrical components.

Naturally, the second transistor may be provided in series with the first transistor or may be used for breaking a connection between another pair of one of the first and second terminals and one of the third and fourth terminals. Also, other electrical components may be provided in series with the second transistor and connected to the fourth and/or fifth legs to connect these legs to the pertaining terminals via such other components.

In this situation, it is preferred that the Zener diode and the second diode are provided so as to have the direction of conduction from the same two (first/third terminals and second/fourth terminals) terminals to the other two of the first, second, third and fourth terminals.

In one embodiment, the system further comprises a third diode being positioned so as to conduct from the fourth leg and to the fifth leg. This third diode may be used for the same purpose as the first diode.

In addition, it may be desired that the first and third diodes have opposite directions of conduction, at least if the transistors are provided in series, so that one of the diodes has a direction of conduction from the first/second terminals and toward the third/fourth terminals and the other diode in the opposite direction. If the transistors are provided in parallel, the first and third diodes preferably are provided with identical directions (from or toward the first/second terminals). Then, if a current is to be prevented, the transistor having the diode blocking in that direction may be used for controlling or blocking that current.

In one embodiment, the system further comprises means for generating a signal to the third and/or sixth legs so as to operate the transistor(s). Such means may comprise sensors or the like for e.g. sensing that power is supplied to the consumer and/or the third/fourth terminals, where it may be wished to then disconnect the first/second terminals, especially in the situation where a battery is connected to such terminals. Instead of a sensor, the generating means may derive the signals from the power provided.

A second aspect of the invention relates to an apparatus comprising a system according to the first aspect using the Zener diode as the protective element as well as a battery having a positive pole connected to the first terminal and a negative pole being connected to the second terminal, the Zener diode being connected so as to conduct from the negative pole to the positive pole.

In this situation, the breakdown voltage of the Zener diode preferably is chosen exceeding the operating or maximum voltage of the battery, so that the Zener diode does not act as a protective element during normal operating or power providing of the battery. However, if the voltage over the battery increases, such as during a mistake or coupling in/out of the battery, the Zener diode will act to disconnect the battery from the consumer.

A third aspect of the invention relates to a vehicle or vessel comprising an apparatus according to the second aspect of the invention as well as means for charging the battery by providing a current to the first and second terminals. In this situation, suddenly disconnecting the charging means from the battery or disconnecting the battery from the charging means/consumer may bring about a charge surge which could destroy the consumer, if this was not prevented due to the operation of the first transistor.

In a fourth aspect, the invention relates to a method for protecting a power consuming circuit, the method comprising:
  receiving power on at least a first and a second terminal,
  supplying received power to a power consuming unit via a third and fourth terminal, the first and third terminals being interconnected and the second and fourth terminals being interconnected,
  providing a protective element between one of the group consisting of the first and third terminals and that of the second and fourth terminals connected to the one terminal, the protective element outputting a signal, if a voltage thereover exceeds a predetermined voltage,
  a signal output from the protective element operating a first transistor to break an electrical connection between one of the first and second terminals and one of the third and fourth terminals.

In this situation, the power may be provided and supplied over the terminals as a DC or AC power.

Naturally, the signal may be an increased, or reduced, voltage or current.

In one embodiment, the providing step comprises providing, as the protective element, a Zener diode in series with one or more first electrical components, the Zener diode having a breakdown voltage corresponding to the predetermined voltage. As mentioned above, other types of protective elements are also possible.

In that or another embodiment, the method may further comprise providing a first diode so as to conduct from the first leg and to the second leg.

Also, the method may further comprise:
providing a second diode in series with one or more second electrical components and between a predetermined one of the group consisting of the first and third terminals and one of the group consisting of the second terminals and fourth terminals, such as that terminal connected to the predetermined one terminal,
if power is provided to the first and second terminals and inverted in relation to a predetermined polarization, preventing received power from being provided to the third and fourth terminals by operating a second transistor to break an electrical connection between a predetermined one of the first and second terminals and that of the third and fourth terminals connected to the predetermined one terminal.

As mentioned above, it may be preferred that the Zener diode and the second diode are provided so as to have the direction of conduction from the same two (first/third terminals and second/fourth terminals) terminals to the other two of the first, second, third and fourth terminals.

In one embodiment, the method further comprises providing a third diode so as to conduct from the fourth leg and to the fifth leg.

In one embodiment, the power providing step comprises a battery having a positive pole connected to the first terminal and a negative pole being connected to the second terminal, the Zener diode being connected so as to conduct from the negative pole to the positive pole.

One embodiment further comprises the step of charging the battery by providing a current to the first and second terminals.

Naturally, the transistor(s) may be used also in other situations for disconnecting the first/second terminals from the third/fourth terminals. In one embodiment, the method further comprises the step of determining that power is supplied to the consumer from a second source and transmitting a signal to the third and/or sixth legs. In this situation, it may be desired to ensure that no such supplied power reaches the first/second terminals, especially in the situation where a battery is connected to such terminals.

BRIEF DESCRIPTION OF THE DRAWINGS

In the following, preferred embodiments are illustrated with reference to the drawing, wherein.

DETAILED DESCRIPTION OF THE PREFERRED EMBODIMENTS

Figure 1:
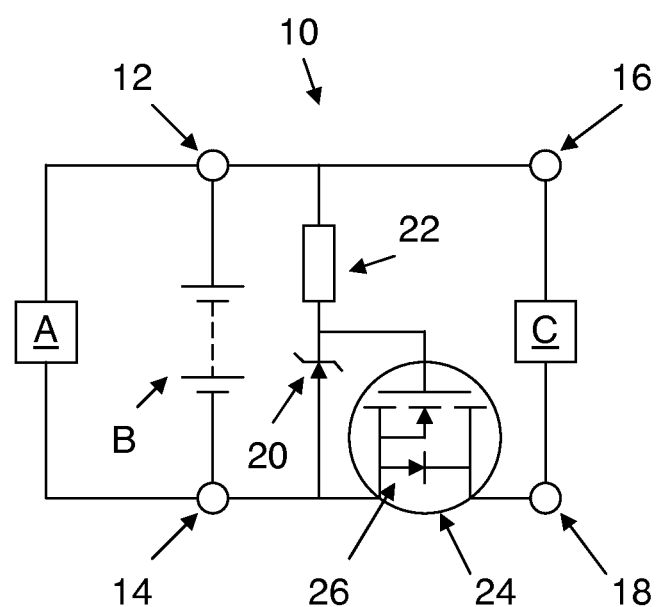
FIG. 1 illustrates a first embodiment of the system according to the invention and FIG. 2 illustrates a second embodiment of the system according to the invention combined with inverse battery protection.

FIG. 1 illustrates a first embodiment according to the invention wherein the system 10 is provided between two pairs of terminals 12/14 and 16/18 respectively.

Terminals 12/14 are connected to a battery B and terminals 16/18 are connected to a consumer C, where the system 10 is adapted to provide power from the battery B to the consumer C.

Terminals 12 and 16 are connected by a conductor. Between terminals 14 and 18, a transistor 24 is provided with the collector/sink connected to the terminal 14 and emitter/drain connected to the terminal 18.

The gate/base of the transistor 24 is connected between a Zener diode 20 and a resistor 22 connected in series between the terminals 12 and 14.

Also, the battery B is being charged by an alternator A.

Under normal operation, the voltage provided by the alternator A and/or battery B will be below the breakdown voltage of the Zener diode 20, which will then operate to have a current flow from the terminal 12 through the resistance 22 to the base/gate of the transistor 24, which then will allow a current to flow between terminals 14 and 18, whereby the consumer C is supplied power from the alternator A and/or battery B.

The operation of the system 10 however changes under so-called Load Dump situations, where the Battery B is suddenly disconnected from the alternator A, or where the battery B is connected (in the absence of alternator A) to the terminals 12 and 14. In this situation, a high voltage is generated over the terminals 12 and 14. In a 10-32V system of a vehicle, this increased voltage may be as high as 120V. Naturally, any voltage regime may be used. This voltage, if applied to the consumer C, may destroy the consumer C or parts thereof, such as semiconductor devices therein.

The system 10, however prevents this situation in that this high voltage will exceed the breakdown voltage of the Zener diode 20, whereby gate/base the transistor 24 reaches the potential of the terminal 14, which will make the transistor 26 "disconnect" the terminal 14 from the terminal 18, thus protecting the circuits of the consumer C.

In this circuit, the "detection" of the exceeded voltage is performed by the Zener diode 20. Naturally, also other types of circuits may be used, such as amplifiers, comparators, voltage dividers or the like.

Naturally, the Zener diode 20 and transistor 24 are selected to detect and withstand, respectively, the exceeded voltage. In the present situation, the battery B provides a voltage in the interval of 10-32V, the Zener diode 20 has a breakdown voltage of 36V, the resistor 22 may be a 22 kΩ resistor, and the transistor 24 may be able to withstand at least 100V.

It is noted that it may be desired to include a delay circuit, such as a Schmidt trigger, in order to not open the transistor 24 immediately when the voltage over the Zener diode 20 falls below the breakdown voltage. Thus, it may be desired to not open the transistor 24, until the voltage falls below a predetermined voltage, such as 3V, below the breakdown voltage.

The present transistor 24 may be any type of transistor. The presently depicted transistor has a protection diode 26 therein. This is not required but is desired, as this will reduce the heat dissipation required a great deal.

Figure 2:
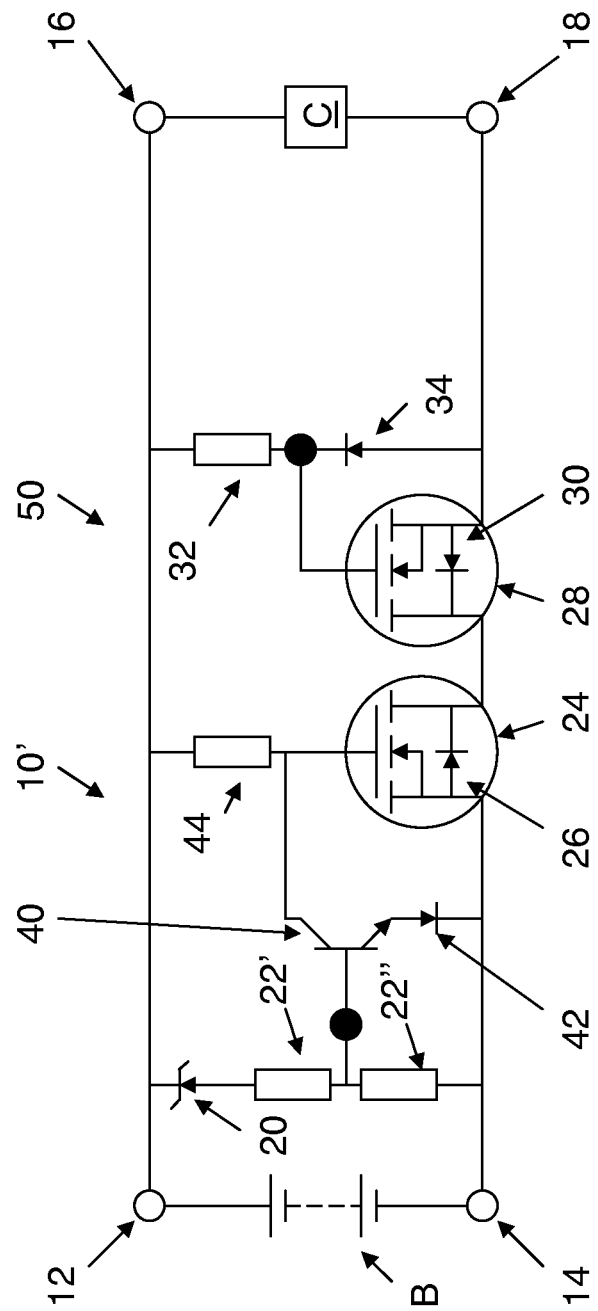

FIG. 2 illustrates a circuit 50 with a semi-circuit 10' which corresponds to the circuit 10 of FIG. 1.

In FIG. 2, the alternator A has been left out, but it will usually still be present, at least in vehicles or vessels.

The operation of the Zener diode 20 is retained, but the set-up is altered so that it now is positioned in series with two resistors 22' and 22" between terminals 12 and 14. A transistor 40 is positioned with its base/gate connected between the resistors 22' and 22", the collector to the base/gate of the transistor 24 and the emitter coupled, via a diode 42, to the terminal 14. Also, a resistor 44 is provided between the base/gate of the transistor 24 and the terminal 12.

Again, if the voltage over the Zener diode 20 exceeds the breakdown voltage, a current will flow to the base/gate of the transistor 40 which will cause a current to flow to the base/gate of the transistor 24, which again prevents current flow from the collector/sink to the emitter/drain.

In addition, the circuit 50 comprises another transistor 28, the base/gate of which is coupled between a diode 34 and a resistor 32 coupled in series between the terminals 16 and 18.

The operation of the transistor 28 is seen in the situation where the battery B is inverted. This may be the case where the battery B has been replaced incorrectly. This problem is known, and the solution of protecting the consumer C from this using a transistor 28 is known from e.g. US2008/0198522. Then, the diode 34 will become conducting, pulling the collector/sink of transistor 28 to terminal 18, whereby the transistor 28 will "close". Also, the protective diode 28 will prevent current flow from the (now positive) terminal 14 to the terminal 18.

Thus, when no Load Dump takes place, the transistor 24 is conducting. If a Load Dump takes place, the transistor 24 is non-conducting, and the protection diode 26 thereof will prevent any current from flowing from the terminal 18 to the terminal 14. The transistor 28, however, remains open, and the protection diode 30 thereof will allow current to flow.

On the other hand, if the battery B is inverted, the transistor 28 is blocking, and the protection diode 30 will prevent current from flowing from the terminal 14 to the terminal 18. The transistor 26 will not act to protect the consumer C from this situation.

In FIG. 2 is two black dots are provided between the resistor 32 and the diode 34 and the two resistors 22' and 22", respectively. These positions in the circuit 50 may be used for controlling the operation of the transistors 26 and 28 in other situations where it is also desired to de-couple the consumer C from the battery B and/or alternator A. One situation where this is the situation is that in which an external power source is used for feeding the consumer C. in one situation, where such applied voltage is lower than the voltage provided by the battery, the battery will still power the consumer, which is not desired. If such applied voltage exceeds that of the battery, it will power the consumer but will also charge the battery, which may not be desired or allowed. In vehicles or vessels, producers may not allow other charging of the battery than by the alternator A. Thus, if the vehicle/vessel is connected to e.g. AC voltage from a mains network, the power may be allowed to be provided to the consumer C at terminals 16 and 18, but not the battery B. In that situation, a circuit (not illustrated) may be provided for generating a DC signal (such as 12V) provided to the circuit 50 at the black dots. Then, the transistors 16 and 28 will disconnect the terminals 14 and 18. Also, the diodes 30 will prevent any current from flowing, so that the consumer C is powered by this external source without affecting the battery B and alternator A.

It is noted that the circuits 10' and 50 may be interchanged without changing functionality.

While the present invention has been illustrated and described with respect to a particular embodiment thereof, it should be appreciated by those of ordinary skill in the art that various modifications to this invention may be made without departing from the spirit and scope of the present.

What is claimed is:

1. A system for protecting a power consuming circuit, the system comprising:
a first and a second terminal adapted to receive power,
a third and a fourth terminal being adapted to supply received power to the power consuming circuit, the first terminal being connected to the third terminal and the second terminal being connected to the fourth terminal,
a first transistor having at least a first, a second and a third leg, the first leg being connected to one of the first and second terminals and the second leg being connected to that of the third and fourth terminals connected to the one terminal, the transistor being adapted to provide or break a conductive connection between its first and second legs based on a signal on the third leg, the other of the first and second terminals and of the third and fourth terminals being electrically interconnected,
a protective element connected between one of the group consisting of the first and third terminals and one of the group consisting of the second and fourth terminals, the protective element being adapted to output a signal, if the voltage thereover exceeds a predetermined voltage;
means for transmitting a signal from the protective element to the third leg,
means for preventing power from flowing from the first and second terminals to the third and fourth terminals, if a power source is positioned erroneously, the preventing means comprising a second transistor having at least a fourth, a fifth and a sixth leg, the fourth leg being connected to a predetermined one of the first and second terminals and the fifth leg being connected to that of the third and fourth terminals connected to the predetermined one terminal, the second transistor being adapted to provide or break a conductive connection between its fourth and fifth legs based on a signal on the sixth leg,
and the second transistor being connected in series with the first transistor, such that the fourth leg of the second transistor is connected to the same of the first and second terminals as the first leg of the first transistor and the fifth leg of the second transistor is connected to the same of the third and fourth terminals as the second leg of the first transistor,
a second diode connected in series with one or more second electrical components and between one of the group consisting of the first and third terminals and one of the group consisting of the second and fourth terminals,
means for transmitting a signal to the sixth leg, the signal corresponding to a voltage over one or more of the diode and the one or more second electrical components.

2. The system according to claim 1, wherein the protective element comprises a Zener diode connected in series with one or more first electrical components, the Zener diode having a breakdown voltage corresponding to the predetermined voltage, the signal corresponding to a voltage over one or more of the Zener diode and the one or more first electrical components.

3. The system according to claim 1, further comprising a first diode being positioned so as to conduct from the first leg and to the second leg.

4. The system according to claim 1, further comprising a third diode being positioned so as to conduct from the fourth leg and to the fifth leg.

5. The system according to claim 1, further comprising means for generating a signal to the third and/or sixth leg.

6. An apparatus comprising a system according to claim 2 and a battery having a positive pole connected to the first terminal and a negative pole being connected to the second terminal, the Zener diode being connected so as to conduct from the negative pole to the positive pole.

7. A vehicle or vessel comprising an apparatus according to claim 6 as well as means for charging the battery by providing a current to the first and second terminals.

8. A method for protecting a power consuming circuit, the method comprising:

receiving power on at least a first and a second terminal, supplying received power to a power consuming unit via a third and fourth terminal, the first and third terminals being interconnected and the second and fourth terminals being interconnected, providing a protective element between one of the group consisting of the first and third terminals and that of the second and fourth terminals connected to the one terminal, the protective element outputting a signal, if a voltage thereover exceeds a predetermined voltage, a signal output from the protective element operating a first transistor to break an electrical connection between one of the first and second terminals and one of the third and fourth terminals, the first transistor having at least a first, a second and a third leg, the first leg being connected to one of the first and second terminals and the second leg being connected to that of the third and fourth terminals connected to the one terminal, providing a second diode in series with one or more second electrical components and between a predetermined one of the group consisting of the first and third terminals and one of the group consisting of the second terminals and fourth terminals, if power is provided to the first and second terminals and inverted in relation to a predetermined polarization, preventing received power from being provided to the third and fourth terminals by operating a second transistor having at least a fourth, a fifth and a sixth leg, the fourth leg being connected to a predetermined one of the first and second terminals and the fifth leg being connected to that of the third and fourth terminals connected to the predetermined one terminal, in order to break an electrical connection between a predetermined one of the first and second terminals and that of the third and fourth terminals connected to the predetermined one terminal, and with the second transistor being connected in series with the first transistor such that the fourth leg of the second transistor is connected to the same of the first and second terminals as the first leg of the first transistor and the fifth leg of the second transistor is connected to the same of the third and fourth terminals as the second leg of the first transistor.

9. The method according to claim 8, wherein the providing step comprises providing, as the protective element, a Zener diode in series with one or more first electrical components, the Zener diode having a breakdown voltage corresponding to the predetermined voltage.

10. The method according to claim 8, further comprising providing a first diode so as to conduct from the first leg and to the second leg.

11. The method according to claim 8, further comprising providing a third diode so as to conduct from the fourth leg and to the fifth leg.

12. The method according to claim 9, wherein the power providing step comprises a battery having a positive pole connected to the first terminal and a negative pole being connected to the second terminal, the Zener diode being connected so as to conduct from the negative pole to the positive pole.

13. The method according to claim 8, further comprising the step of charging the battery by providing a current to the first and second terminals.

14. The method according to claim 8, further comprising the step of determining that power is supplied to the consumer from a second source and transmitting a signal to the third and/or sixth legs.

* * * * *